(12) United States Patent
Michalak et al.

(10) Patent No.: US 10,647,036 B2
(45) Date of Patent: May 12, 2020

(54) INSULATING ELEMENT

(71) Applicant: SIKA TECHNOLOGY AG, Baar (CH)

(72) Inventors: Piotr Michalak, Dietikon (CH); Steffen Richter, Schlieren (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/081,252

(22) PCT Filed: Mar. 17, 2017

(86) PCT No.: PCT/EP2017/056347
§ 371 (c)(1),
(2) Date: Aug. 30, 2018

(87) PCT Pub. No.: WO2017/158143
PCT Pub. Date: Sep. 21, 2017

(65) Prior Publication Data
US 2019/0070759 A1   Mar. 7, 2019

(30) Foreign Application Priority Data

Mar. 18, 2016 (EP) .................................... 16161238

(51) Int. Cl.
*B62D 29/04* (2006.01)
*B29C 44/00* (2006.01)
(Continued)

(52) U.S. Cl.
CPC ............ *B29C 44/188* (2013.01); *B60R 13/08* (2013.01); *B60R 13/0861* (2013.01);
(Continued)

(58) Field of Classification Search
CPC ........................... B62D 29/002; B29C 44/188
(Continued)

(56) References Cited

U.S. PATENT DOCUMENTS 5,266,133 A   11/1993   Hanley et al.
5,373,027 A   12/1994   Hanley et al.
(Continued)

FOREIGN PATENT DOCUMENTS

EP   0 204 970 A2   12/1986
EP   1 591 224 A1   11/2005
(Continued)

OTHER PUBLICATIONS

Jun. 2, 2017 International Search Report issued in International Patent Application No. PCT/EP2017/056347.
(Continued)

*Primary Examiner* — Dennis H Pedder
(74) *Attorney, Agent, or Firm* — Oliff PLC (57) ABSTRACT

An insulating element for insulating a structural element in a vehicle including a carrier element having an edge region and an expandable material which is provided at least on the edge region on the carrier element. The expandable material projects beyond the edge region of the carrier element in at least one direction so that the expandable material forms a flexible projection in this at least one direction.

11 Claims, 5 Drawing Sheets

(51) Int. Cl.
*B29C 44/18* (2006.01)
*B62D 29/00* (2006.01)
*B60R 13/08* (2006.01)
*B29K 105/00* (2006.01)
*B29L 31/30* (2006.01)
*B29K 667/00* (2006.01)
*B29K 75/00* (2006.01)
*B29K 705/00* (2006.01)
*B29K 675/00* (2006.01)
*B29K 677/00* (2006.01)

(52) U.S. Cl.
CPC ........ *B62D 29/002* (2013.01); *B29K 2075/00* (2013.01); *B29K 2105/0088* (2013.01); *B29K 2105/0094* (2013.01); *B29K 2667/00* (2013.01); *B29K 2675/00* (2013.01); *B29K 2677/00* (2013.01); *B29K 2705/00* (2013.01); *B29L 2031/3002* (2013.01)

(58) Field of Classification Search
USPC .................................................. 296/187.02
See application file for complete search history.

(56) References Cited

U.S. PATENT DOCUMENTS

| | | | |
|---|---|---|---|
| 6,387,470 B1 | 5/2002 | Chang et al. | |
| 6,413,611 B1 | 7/2002 | Roberts et al. | |
| 6,455,146 B1 * | 9/2002 | Fitzgerald | B32B 3/00 156/83 |
| 8,469,143 B2 * | 6/2013 | Prunarety | B62D 29/002 181/256 |
| 8,920,900 B2 * | 12/2014 | Nakayama | B29C 44/18 428/99 |
| 2005/0285292 A1 | 12/2005 | Mendiboure et al. | |
| 2011/0192675 A1 | 8/2011 | Lecroart et al. | |
| 2013/0209197 A1 | 8/2013 | Quaderer et al. | |

FOREIGN PATENT DOCUMENTS

| | | |
|---|---|---|
| WO | 2005/002950 A2 | 1/2005 |
| WO | 2005/080524 A1 | 9/2005 |
| WO | WO2008/059012 * | 5/2008 |
| WO | 2012/174504 A2 | 12/2012 |

OTHER PUBLICATIONS

Sep. 18, 2018 International Preliminary Report on Patentability issued in International Patent Application No. PCT/EP2017/056347.

Dec. 11, 2019 Office Action issued in European Patent Application No. 17 712 081.3.

* cited by examiner

INSULATING ELEMENT

The invention relates to an insulating element having a carrier element and an expandable material, in particular for insulating a structural element having a cavity in a vehicle. Said invention furthermore relates to a system having a structural element and an insulating element disposed therein.

Construction elements such as, for example, bodies and/or chassis frames of transportation and conveyance means, in particular of aquatic or terrestrial vehicles or of aircraft, in many instances have structures having cavities in order for lightweight constructions to be enabled. These cavities however cause the most varied of problems. Depending on the type of the cavity, the latter has to be sealed in order to prevent the ingress of moisture and contaminations which can lead to corrosion of the construction elements. It is often also desirable for the cavity and thus the construction element to be substantially reinforced but for the low weight to be maintained. It is often also necessary for the cavity and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Baffle elements are therefore used in particular in the automotive industry but also in the aviation and nautical industry in order for cavities to be sealed and/or to be acoustically partitioned, or reinforcement elements are used in order for cavities to be reinforced.

Figure 1:
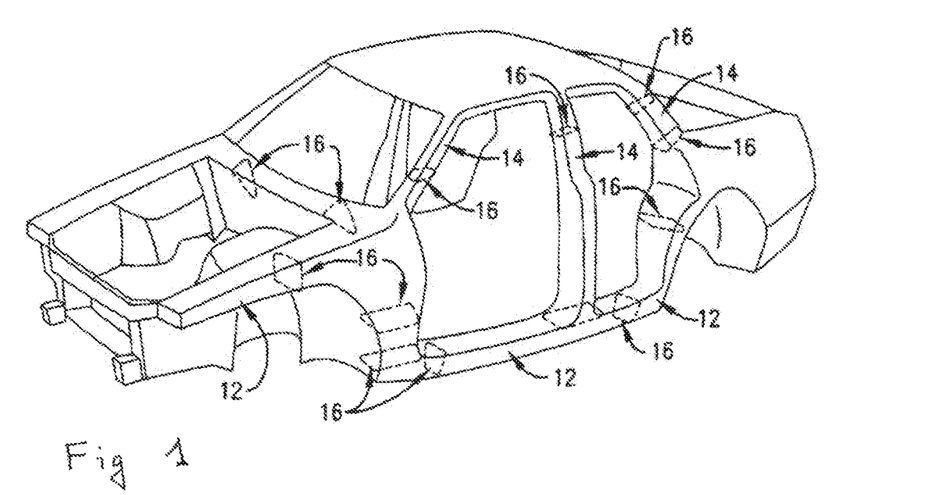
FIG. 1 shows an exemplary illustration of a body according to the prior art.

A body of an automobile is schematically illustrated in FIG. 1. The body 10 herein has various structures having cavities such as, for example, pillars 14 and supports or stays 12, respectively. Such structural elements 12, 14 having cavities are usually sealed or reinforced, respectively, using sealing and/or reinforcement elements 16.

Figure 2A:
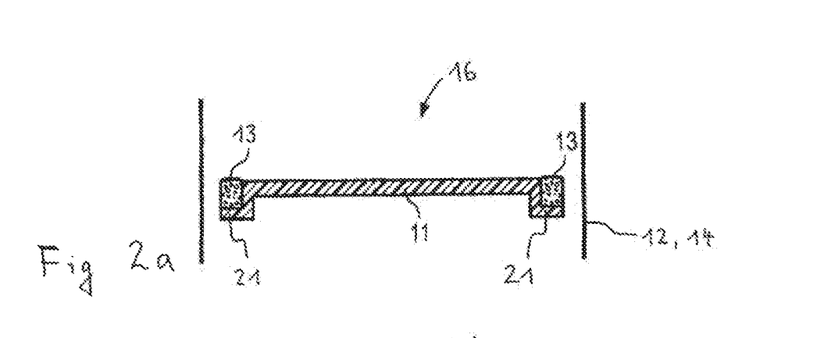
FIGS. 2a and 2b show schematic illustrations for explaining an exemplary insulating element according to the prior art.
Figure 2B:
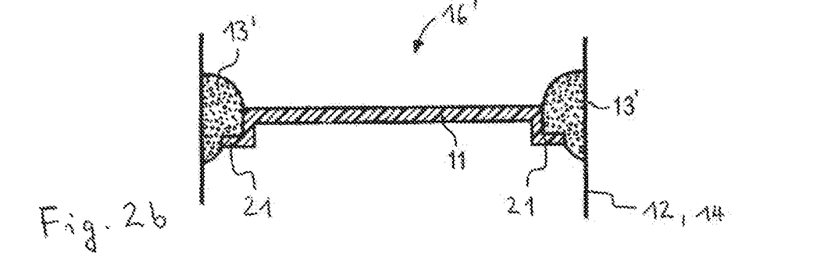

FIGS. 2a and 2b schematically show a known concept for the sealing and/or reinforcing closure of openings or cavities, respectively, in a motor vehicle.

FIG. 2a herein shows an insulating element 16 prior to an expansion of an expandable material 13. FIG. 2b shows the same insulating element 16 but upon an expansion of the expandable material 13, therefore with the expanded material 13'.

The insulating element 16 is located in a cavity of a body structure such as is illustrated in FIG. 1, for example. A portion of such a structural element 12, 14 of a body is schematically illustrated in FIGS. 2a and 2b. The insulating element 16 comprises a carrier element 11 which has a peripheral region 21. The expandable material 13 herein is disposed substantially on said peripheral region 21 of the carrier element 11.

A gap between the insulating element 16 and the structural element 12, 14 exists prior to the expansion of the expandable material 13. Said gap permits the structural element 12, 14 to be coated in order to achieve an anticorrosion protection of the structural element 12, 14. The expandable material 13 upon said coating is usually expanded by way of a thermal influence, wherein the expanded material 13' on account thereof closes the gap between the insulating element 16 and the structural element 12, 14. Fixing of the insulating element 16 in the structural element 12, 14 is moreover also simultaneously achieved on account of the expansion of the expandable material 13. An insulating element 16 that is fastened in the structural element 12, 14 in such a manner reinforces the structural element 12, 14, on the one hand, and closes the cavity in the structural element 12, 14, on the other hand.

It is disadvantageous in such insulating elements 16 that an individually adapted insulating element 16 has to be fabricated for each embodiment of a structural element 12, 14. This is necessary in particular because a gap between the insulating element 16 and the structural element 12, 14 has to be sufficiently large so as to enable an ideally good coating of the structural element 12, 14 prior to the expansion of the expandable material 13, on the one hand, and said gap must not be too large in order for the expandable material 13 on account to the expansion to be able to overcome said gap and be able to insulate in a reliable and complete manner, on the other hand. The insulating element thus has to be adapted precisely to the respective structural element in order of a desired gap width to be achieved. However, such individually fabricated insulating elements for each shape of structural elements are expensive and complex. For example, different insulating elements have to be fabricated for different body variants of one and the same automobile model in order for a reliable insulation of the different structural elements 12, 14 to be obtained.

The invention is therefore based on the objective of providing an improved insulating element of the type explained above, said insulating element being capable of being used for different structural elements.

Said objective is achieved by an insulating element for insulating a structural element in a vehicle, the insulating element comprising a carrier element having a peripheral region and an expandable material which is disposed at least on a peripheral region on the carrier element. The expandable material herein in at least one direction protrudes beyond the peripheral region of the carrier element such that the expandable material in said at least one direction forms a flexible projection.

This solution has the advantage that, on account thereof, a plurality of structural elements of different shapes or dimensions, respectively, can be insulated by way of a single insulating element. On account thereof, costs in the development of the insulating element as well as in the logistics in the automotive industry can be saved in that one and the same insulating element can be used in different body variants of an automobile model, for example.

A core concept of the present invention lies in that the flexible projection of the expandable material can adapt to different structural elements. On account of the flexible design of said projection, the projection is more intensively bent in comparatively tight structural elements, and less intensively bent in comparatively wide structural elements. It is essential herein that the expandable material upon expansion completely closes the gap between the carrier element and the structural element.

The term "insulating element" in the context of the present invention comprises elements for partitioning and/or reinforcing and/or insulating a structural element. These various properties of such an insulating element herein can arise individually or in combination.

In one exemplary embodiment a length of the projection measured along a plane of the carrier element is between 5 and 50 mm, preferably between 5 and 30 mm, particularly preferably between 10 and 20 mm.

Such a dimensioning of the projection has the advantage that, on account thereof, different structural elements of body variants having differences in terms of dimensions of up to a few centimeters can be covered to by way of a single type of an insulating element. Nevertheless, a more reliable fastening of the insulating element to the body is simultaneously achieved since, on account thereof, the spacing between the body and the carrier element is not excessive.

In one exemplary embodiment a thickness of the projection measured perpendicularly to the plane of the carrier element is between 2 and 20 mm, preferably between 3 and 15 mm, particularly preferably between 3 and 10 mm.

Such a dimensioning of the projection has the advantage that sufficient expandable material is made available in order for the gap between the carrier and the structural element to be reliably closed, on the one hand, and a sufficiently high flexibility of the projection is simultaneously achieved, on the other hand, so that the projection can adapt to different cavities or structural elements, respectively, in a flexible manner.

The carrier element in one exemplary embodiment has at least one rib which in said at least one direction extends from the peripheral region of the carrier element such that the at least one rib supports the flexible projection.

Such a rib offers the advantage that the flexible projection can be additionally supported at provided locations. Such provided locations can be places where the flexible projection in an expanded state of the expandable material has the tendency to sag or droop, for example. Such sagging or drooping, respectively, of the flexible projection can be prevented by providing one or a plurality of such ribs.

In one advantageous refinement the at least one rib in said at least one direction extends from the peripheral region of the carrier element by a distance that is smaller than the distance by which the expandable material in said at least one direction protrudes beyond the peripheral region of the carrier element.

The carrier element in one further advantageous refinement has a plurality of ribs for supporting the flexible projection. Said plurality of ribs herein can extend in the same direction or in various directions from the peripheral region of the carrier element. Said plurality of ribs can moreover be provided beside one another or else individually.

In one further advantageous refinement a length of the rib measured along a plane of the carrier element and along said at least one direction is between 4 and 40 mm, preferably between 5 and 25 mm, particularly preferably between 10 and 18 mm.

In one further advantageous refinement a width of the rib measured along a plane of the carrier element and transversely to said at least one direction is between 2 and 50 mm, preferably between 2 and 30 mm, particularly preferably between 2 and 15 mm.

In one exemplary embodiment the projection extends substantially in the plane of the carrier element. In one alternative exemplary embodiment the projection extends in a plane which forms an angle in relation to the plane of the carrier element. In one exemplary refinement said angle is between 10 and 80°, preferably between 20 and 70°, particularly preferably between 30 and 60°.

Another variant of embodiment can be preferable, depending on the field of application. For example, it can be sufficient for very flexible projections that the projection extends in the plane of the carrier element. On account of the very high flexibility, such a projection can be readily bent into the desired position in the structural element. In the case of slightly less flexible projections it can however be advantageous for the projection to be angled already prior to the assembly in a structural element. This has the advantage that such angled projections have to be bent to a lesser extent in order for the intended position in the structural element to be obtained. Furthermore, an advantageous geometry can be chosen, depending on the cross section or material of the expandable material, so as to achieve a flexibility of the projection that corresponds to the intended application.

In one exemplary embodiment the projection has a rectangular, a trapezoidal, a triangular, an irregularly shaped, a convex, or a concave cross section.

Here too, an advantageous cross section of the projection can be chosen, depending on the field of application of the insulation element. For example, projections having a rectangular cross section can again be configured for very flexible expandable materials, and trapezoidal cross sections that converge at an acute angle, or triangular cross sections, respectively, can be configured for somewhat less flexible expandable materials.

In one exemplary embodiment the projection in an axis perpendicular to the plane of the carrier element extends only above the peripheral region beyond which the projection protrudes.

A projection configured in such a manner offers advantages in the production of the insulating element, on the one hand, and projections that are configured in such a manner can be more readily handled when being assembled in the structural element, on the other hand.

In one exemplary embodiment the projection has at least one protrusion for support on the structural element.

Such a protrusion offers the advantage that the projection can be supported on an ideally small face on the structural element. On account thereof the structural element can be ideally completely coated prior to the expansion of the expandable material. In a refinement a plurality of such protrusions can be provided. On account thereof, the projection can be supported in a more stable manner across a wider region on the structural element.

The protrusion in one exemplary refinement is configured as an arcuate convexity. This has the advantage that the protrusion and the structural element are in mutual contact essentially only at one point in that the structural element bears tangentially on the arcuate convexity of the protrusion. On account thereof, an ideally complete coating of the structural element can be achieved prior to the expansion of the expandable material.

A system having a structural element and an insulating element according to the description above disposed therein is furthermore proposed.

In one exemplary embodiment the flexible projection of the insulating element is supported on the structural element in at least one location, wherein the projection is bent on account thereof.

This has the advantage that, on account thereof, different variants of structural elements can be insulated by way of a single insulating element, wherein the expandable material adapts to the respective characteristics of the structural element in an ideal manner, thanks to the flexible projection, and on account of the latter bending.

In one exemplary embodiment the projection has at least one protrusion for support on the structural element, wherein the projection is supported on the structural element only by way of said protrusion.

This has the advantage that, on account thereof, a gap between the expandable material prior to the expansion and the structural element is ideally completely preserved, on account of which an ideally good coating of the structural element is enabled.

In one advantageous refinement any contact between the protrusion and the structural element is substantially tangential or punctiform. This has the advantage that, on account thereof, a face of the structural element that is covered by the expandable material is kept ideally small prior to expansion such that the structural element can be coated in an ideally complete manner.

In one exemplary embodiment a gap between the projection and the structural element in a region in which the projection is not supported on the structural element is between 1 and 5 mm, preferably between 2 and 4 mm. It is guaranteed on account thereof that the coating liquid can flow through said gap, on the one hand, and it is ensured on account thereof that a reliable connection between the structural element and the carrier element is achieved by way of the expansion of the expandable material, on the other hand.

Details and advantages of the invention will be described hereunder by means of exemplary embodiments and with reference to schematic drawings. In the drawings.

Figure 3A:
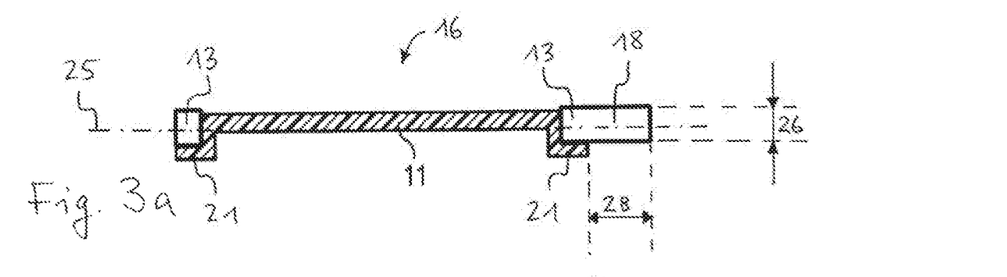
FIGS. 3a to 3d show a schematic illustration of an exemplary insulating element, and a system having a structural element and such an insulating element inserted therein.

An exemplary insulating element 16 is illustrated in FIG. 3a. The insulating element 16 has a carrier element 11 and an expandable material 13 disposed on the latter. The expandable material 13 in this exemplary embodiment is disposed substantially on peripheral regions 21 of the carrier element 11. The expandable material 13 in at least one direction protrudes beyond the peripheral region 21 of the carrier element 11 such that the expandable material 13 in said at least one direction forms a flexible projection 18. Said projection 18, measured along a plane 25 of the carrier element 11, has a length 28. Moreover, said projection 18, measured perpendicularly to the plane 25 of the carrier element 11, has a thickness 26. The length 28 of the projection 18 in this exemplary embodiment is approximately 12 mm, and the thickness 26 of the projection 18 is approximately 6 mm.

In this exemplary embodiment according to FIG. 3a only peripheral regions 21 of the carrier element 11 are covered by expandable material 13. In an alternative exemplary embodiment (not illustrated), further and/or other regions of the carrier element 11 can also be covered by expandable material 13.

The flexible projection in the exemplary embodiment according to FIG. 3a extends only in one direction. In an alternative exemplary embodiment (not illustrated), a plurality of such projections 18 can be configured, wherein said plurality of projections 18 can protrude beyond the carrier element 11, or the peripheral regions 21 thereof, respectively, in one or a plurality of directions.

Figure 3B:
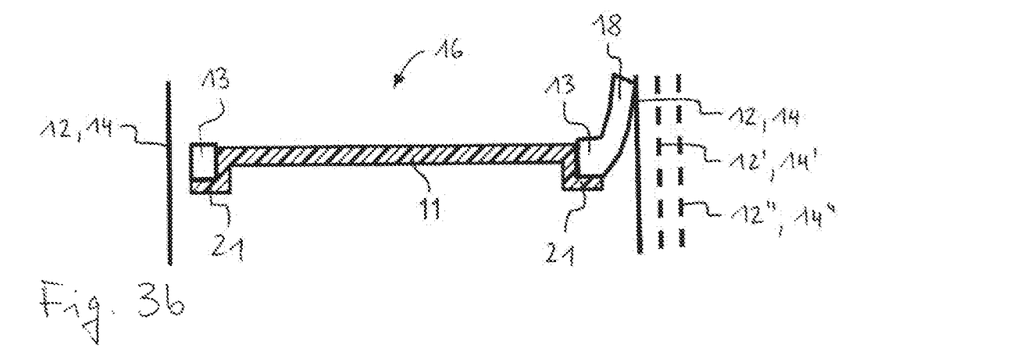
Figure 3C:
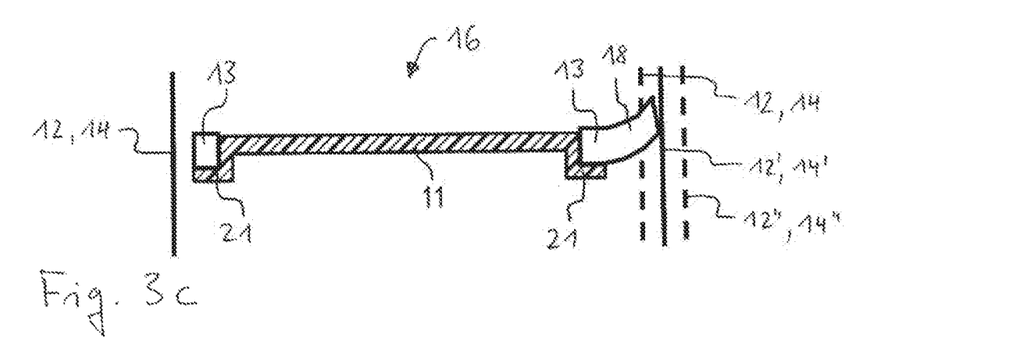
Figure 3D:
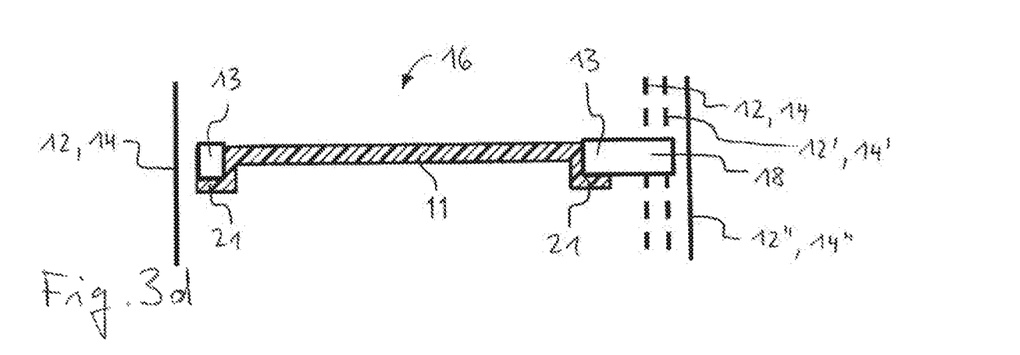

The exemplary insulating element 16 from FIG. 3a in FIGS. 3b, 3c, and 3d is illustrated when inserted in a structural element 12, 14. The insulating element 16 in FIG. 3b herein is inserted in a first variant of the structural element 12, 14; the same insulating element 16 in FIG. 3c is illustrated in a second variant of the structural element 12', 14'; and the same insulating element 16 in FIG. 3d is illustrated in a third variant of the structural element 12", 14".

The flexible projection 18 in the first variant of the structural element 12, 14 according to FIG. 3b is more intensively bent than in the second variant of the structural element 12', 14' according to FIG. 3c, and the flexible projection 18 in the third variant of the structural element 12", 14" is not bent at all. The insulating element 16 illustrated in an exemplary manner enables a reliable partitioning of the region between the structural element 12, 12', 12", 14, 14', 14" and the carrier element 11 to be guaranteed in all three variants of the structural element 12, 12', 12", 14, 14', 14". Such an insulating element 16 can thus be used in different cavities, or structural elements, respectively, of vehicles without the insulating element 16 herein having to be modified or adapted, respectively.

Exemplary variants of embodiment of the flexible projection 18 are illustrated in FIGS. 4a to 4d. The expandable material 13 in FIGS. 4a and 4b herein is disposed only in a peripheral region 21 of the carrier element 11, wherein the expandable material 13 in the exemplary embodiments according to FIGS. 4c and 4d covers further parts of the carrier element 11. Moreover, the exemplary embodiments differ from one another in terms of the cross section of the flexible projection 18 and of the alignment of the latter in space.

Figure 4A:
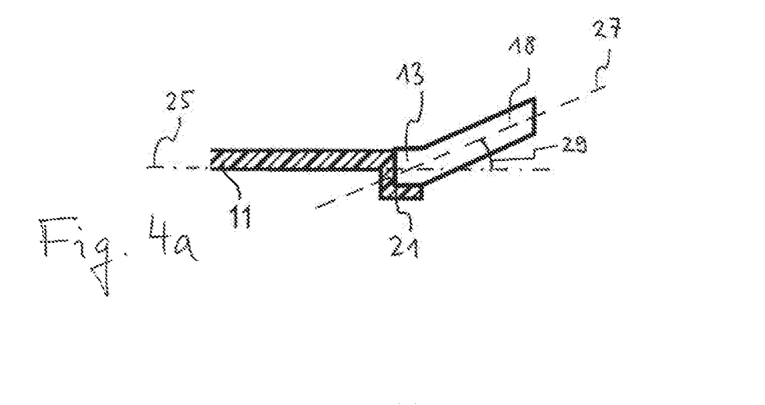
FIGS. 4a to 4d show schematic illustrations of various embodiments of a projection of the expandable material.

The projection 18 in FIG. 4a is configured so as to be angled. A plane of the projection 27 herein conjointly with the plane 25 of the carrier element 11 forms an angle 29. Said angle in this exemplary embodiment is approximately 30°.

Figure 4B:
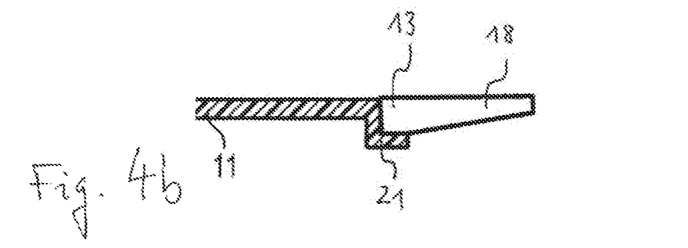

A further variant of embodiment of the projection 18 is schematically illustrated in FIG. 4b. In this exemplary embodiment the projection 18 extends substantially in the plane 25 of the carrier element 11. A cross section of the projection 18 herein is configured so as to be trapezoidal. A higher flexibility of the projection 18 can be achieved on account thereof, for example.

Figure 4C:
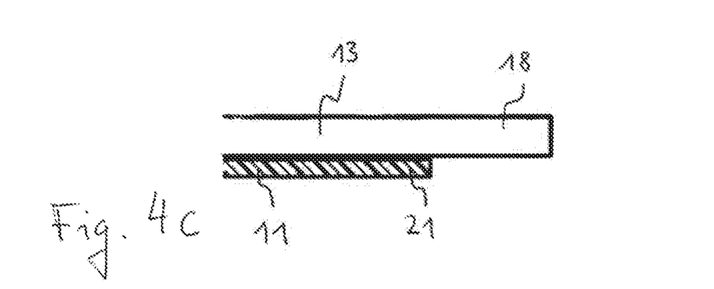

A further variant of embodiment of the projection 18 is schematically illustrated in FIG. 4c. In this exemplary embodiment the projection 18 extends again in the plane of the carrier element 11. The projection 18 in this exemplary embodiment is configured so as to have a rectangular cross section, wherein a thickness of the expandable material 13 is kept consistent and continues in the projection 18.

Figure 4D:
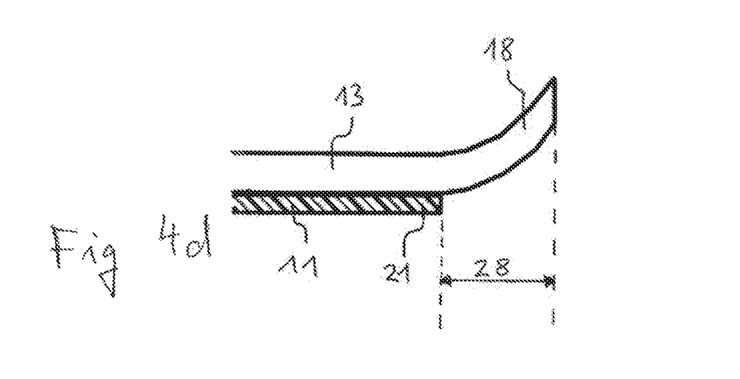

A further variant of embodiment of a projection 18 is schematically illustrated in FIG. 4d. In a manner similar to that of the exemplary embodiment according to FIG. 4a, the project 18 in this exemplary embodiment is again configured so as to be inclined in relation to the plane of the carrier element 11. Moreover, the projection 18 in this exemplary embodiment is embodied so as to be arcuate. This has the advantage that, on account thereof, further bending of the projection 18 for adapting to a specific structural element is facilitated. A length 28 of the projection herein extends along a plane of the carrier element 11.

Figure 5A:
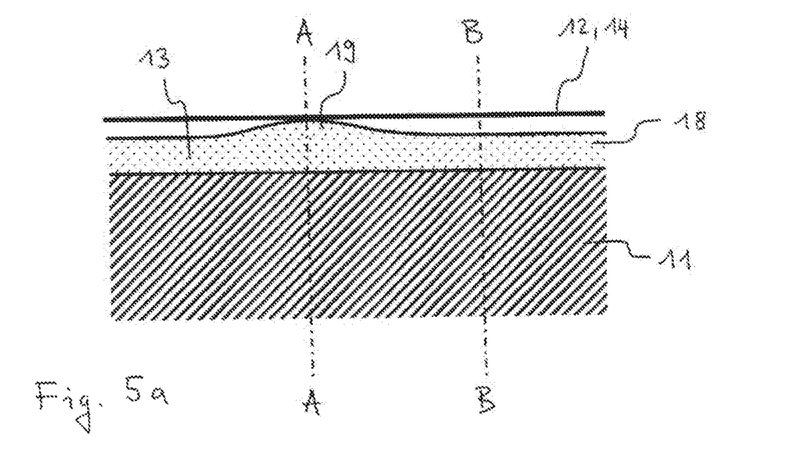
FIGS. 5a to 5c show schematic illustrations of a system having a structural element and an insulating element inserted therein.
Figure 5B:
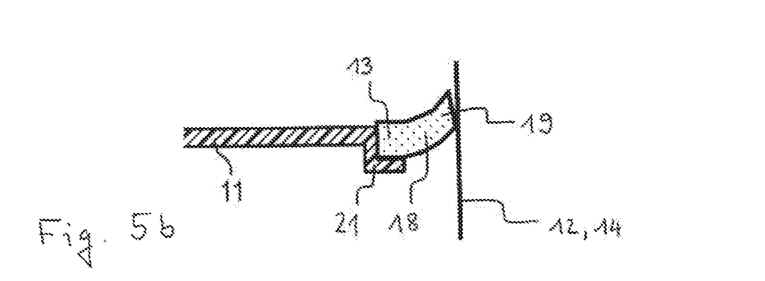
Figure 5C:
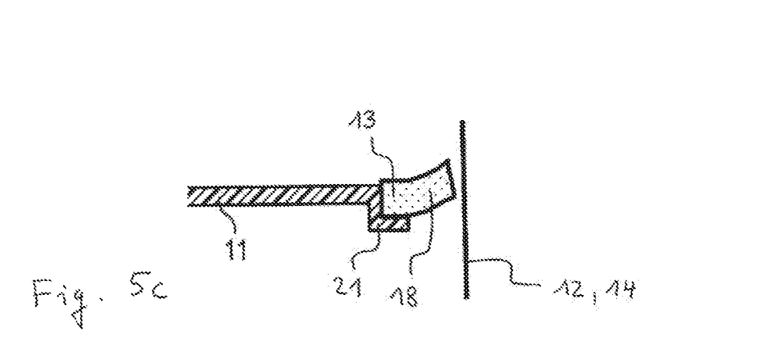

A fragment of an insulating element in a structural element 12, 14 is schematically illustrated in FIGS. 5a to 5c. The expandable material 13 of the flexible projection 18 in this exemplary embodiment has a protrusion 19. This protrusion 19 serves for supporting the projection 18 on the structural element 12, 14.

Sections from FIG. 5a are in each case illustrated in FIGS. 5b and 5c. FIG. 5b herein shows the section A-A, and FIG. 5c shows the section from FIG. 5a along the line B-B. It can be seen herein that the projection 18 is supported on the structural element 12, 14 only by way of the protrusion 19, and that a gap between the projection 18 and the structural element 12, 14 is otherwise present. Said gap enables an ideally complete coating of the structural element 12, 14 prior to the expansion of the expandable element 13.

Figure 6A:
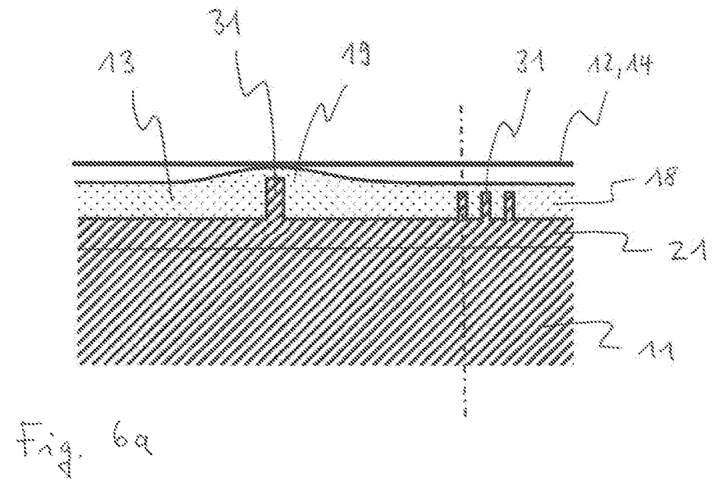
FIGS. 6a and 6b show a schematic illustration of a system having a structural element and an insulating element inserted therein.
Figure 6B:
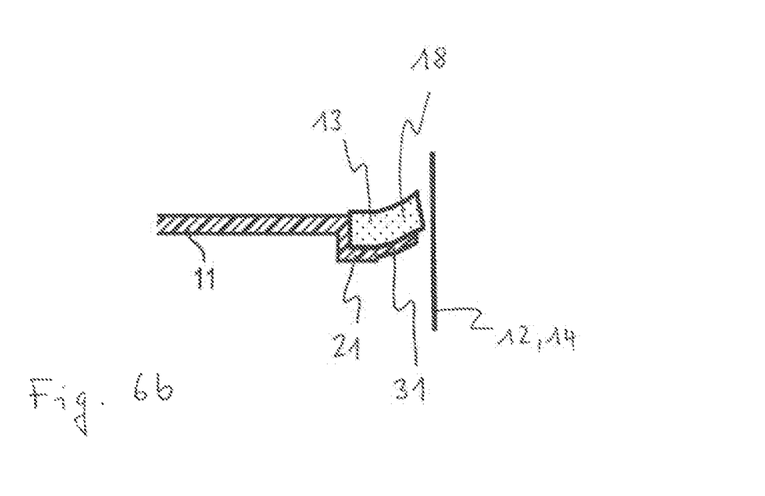

A fragment of an insulating element in a structural element 12, 14 is schematically illustrated in FIGS. 6a and 6b. FIG. 6a herein shows a view of a lower side of the insulating element, wherein part of the expandable material 13 lies behind the peripheral region 21 of the carrier element 11 and is therefore not visible in this view. FIG. 6b shows a section along the section line illustrated in FIG. 6a through the insulating element in the structural element.

The carrier element 11 in this exemplary embodiment according to FIGS. 6a and 6b has a plurality of ribs 31 which extend from the peripheral region 21 of the carrier element 11 in the same direction in which the expandable material 13 for forming the flexible projection 18 likewise protrudes beyond the peripheral region 21 of the carrier element 11, such that the ribs 31 support the flexible projection 18.

As is illustrated in an exemplary manner in FIG. 6a, a rib 31 can support the flexible projection 18 in a location where the expandable material 13 configures a protrusion 19. On the other hand, a rib 31 can also support the flexible projection 18 in a location where the expandable material 13 does not configure any protrusion 19, as is illustrated in an exemplary manner by way of three ribs 31 that are disposed beside one another.

The ribs 31 herein can be disposed individually or beside one another as is likewise illustrated in an exemplary manner in FIG. 6a.

Expandable Materials (Capable of Foaming)

In principle, any arbitrary material that can be made to foam in a controlled manner can be used as the expandable material. Said material herein may or may not have reinforcing properties. The material capable of foaming is typically foamed in a thermal manner, by moisture, or by electromagnetic radiation.

Such an expandable material typically has a chemical or physical propellant. Chemical propellants are organic or inorganic compounds which decompose under the influence of temperature, moisture, or electromagnetic radiation, wherein at least one of the decomposition products is a gas. Compounds which transition into the gaseous aggregate state when the temperature is increased can be used as physical propellants, for example. On account thereof, both chemical as well as physical propellants are capable of generating foam structures in polymers.

The expandable material is preferably foamed in a thermal manner, wherein chemical propellants are used. Azodicarbonamides, sulfo hydrazides, hydrogen carbonates, or carbonates are suitable as chemical propellants, for example.

For example, suitable propellants are also commercially available under the Expancel® brand from Akzo Nobel, Netherlands, or under the Celogen® brand from Chemtura Corp., USA.

The heat required for foaming can be introduced by way of external or by way of internal heat sources such as an exothermal chemical reaction. The material capable of foaming is preferably capable of being foamed at a temperature of $\leq 160°$ C., in particular of $80°$ C. to $150°$ C., preferably of $90°$ C. to $140°$ C.

Single-component non-free flaming epoxy resin systems which in particular have an enhanced impact resistance and contain thixotropy agents such as aerosols or nanoclays are suitable as expandable materials at room temperature, for example. For example, epoxy resin systems of this type comprise 20 to 50% by weight of a liquid epoxy resin, 0 to 30% by weight of a solid epoxy resin, 5 to 30% by weight of viscosity modifiers, 1 to 5% by weight of physical or chemical propellants, 10 to 40% by weight of fillers, 1 to 10% by weight of thixotropy agents, and 2 to 10% by weight of heat-activatable curing agents. Reactive liquid rubbers based on nitrile rubber, or derivates of polyether polyol polyurethanes, core shell polymers, and similar systems known to a person skilled in the art are suitable as viscosity modifiers.

Single-component polyurethane compositions, constructed from crystalline polyesters comprising OH groups mixed with further polyols, preferably polyether polyols, and polyisocyanates with blocking isocyanate groups, that include propellants are likewise suitable expandable materials. The melting point of the crystalline polyester should be $\geq 50°$ C. The isocyanate groups of the polyisocyanate can be blocked by nucleophiles such as caprolactam, phenols, or benzoxalones, for example. Blocked polyisocyanates such as are used, for example, in the powder-coating technology and are commercially available from Degussa GmbH, Germany, for example under the Vestagon® BF 1350 and Vestagon® BF 1540 brands are furthermore suitable. So-called encapsulated or surface-activated polyisocyanates which are known to a person skilled in the art and are described, for example, in EP 0 204 970 are likewise as isocyanates.

Propellants containing two-component epoxy/polyurethane compositions such as are described, for example, in WO 2005/080524 A1 are furthermore suitable as expandable materials.

Ethylene vinyl acetate compositions containing propellants are furthermore suitable as expandable materials.

Expandable materials that are likewise suitable are marketed by Sika Corp., USA, for example under the SikaBaffle® 240, SikaBaffle® 250 or SikaBaffle® 255 brand and are described in U.S. Pat. Nos. 5,266,133 and 5,373,027. Such expandable materials are particularly preferable for the present invention.

For example, expandable materials having reinforcing properties which are marketed under the brand SikaReinforcer® 941 by Sika Corp., USA, are preferred as expandable materials having reinforcing properties. The latter are described in U.S. Pat. No. 6,387,470.

Carrier Material

The carrier material can be composed of arbitrary materials. Preferred materials are plastics materials, in particular polyurethanes, polyamides, polyesters, and polyolefins, preferably high-temperature-resistant polymers such as poly (phenylene ether), polysulfones, or polyether sulfones, which are in particular also foamed; metals, in particular aluminum and steel; or grown organic materials, in particular wood or other (densified) fibrous materials, or glass-type or ceramic materials; especially also foamed materials of this type; or arbitrary combinations of said materials. Polyamide, in particular polyamide 6, polyamide 6.6, polyamide 11, polyamide 12, or a mixture thereof, is particularly preferably used.

The carrier element can furthermore have an arbitrary construction and an arbitrary structure. Said carrier element can be for example solid, hollow, or foamed, or have a grid structure. The surface of the carrier element can typically be smooth, rough, or structured.

In the case of sealing and reinforcement elements according to the invention in which the expandable material is located on a carrier element, the production method differs according to whether the carrier is or is not composed of a material that is capable of processing by injection molding. In the affirmative, a two-component injection molding method is usually used. Herein a first component, in this case the carrier element, is injected first. After the solidification of said first component, the cavity in the tool is enlarged or adapted, respectively, or the injection-molded product is laid up in a new tool, and the first component is overmolded with a second component, in this case the expandable material, by way of a second injection apparatus.

If the carrier element is composed of a material which cannot be produced by the injection molding method, thus from a metal, for example, the carrier element is laid up in a respective tool and the carrier element is overmolded with the expandable material. There is of course also the possibility for the expandable material to be fastened to the carrier element by way of special fastening means or methods.

The invention claimed is:

1. A system having a vehicle structural element and an insulating element for insulating the structural element, said insulating element comprising:
  a carrier element having a peripheral region; and
  an expandable material which is disposed at least on the peripheral region on the carrier element, wherein, prior to expansion of the expandable material:
  (i) the expandable material in at least one direction protrudes beyond the peripheral region of the carrier element such that the expandable material in said at least one direction forms a flexible projection, and
  (ii) the flexible projection has at least one protrusion, and the projection is supported on the structural element by way of said protrusion and any contact between the protrusion and the structural element is substantially tangential and/or punctiform.

2. The system as claimed in claim 1, wherein a length of the projection measured along a plane of the carrier element is between 5 and 50 mm and/or wherein a thickness of the projection measured perpendicularly to the plane of the carrier element is between 2 and 20 mm.

3. The system as claimed in claim 1, wherein the carrier element has at least one rib which in said at least one direction extends from the peripheral region of the carrier element such that the at least one rib supports the flexible projection.

4. The system as claimed in claim 1 wherein the projection extends substantially in the plane of the carrier element.

5. The system as claimed in claim 1, wherein the projection extends in a plane which forms an angle in relation to the plane of the carrier element.

6. The system as claimed in claim 5, wherein the angle is between 10 and 80°.

7. The system as claimed in claim 1, wherein the projection has a rectangular, a trapezoidal, a triangular, a convex, or a concave cross section.

8. The system as claimed in claim 1, wherein the projection in an axis perpendicular to the plane of the carrier element extends only above the peripheral region beyond which the projection protrudes.

9. The system as claimed in claim 1, wherein the protrusion is configured as an arcuate convexity.

10. The system as claimed in claim 1, wherein the flexible projection of the insulating element is supported on the structural element in at least one location, and wherein the projection is bent on account thereof.

11. The system as claimed in claim 1, wherein a gap between the projection and the structural element in a region in which the projection is not supported on the structural element is between 1 and 5 mm.

\* \* \* \* \*